Sept. 17, 1940.  E. T. HAWLEY  2,214,961
COMBINED WEIGHT AND SWIVEL DEVICE
Filed April 22, 1939
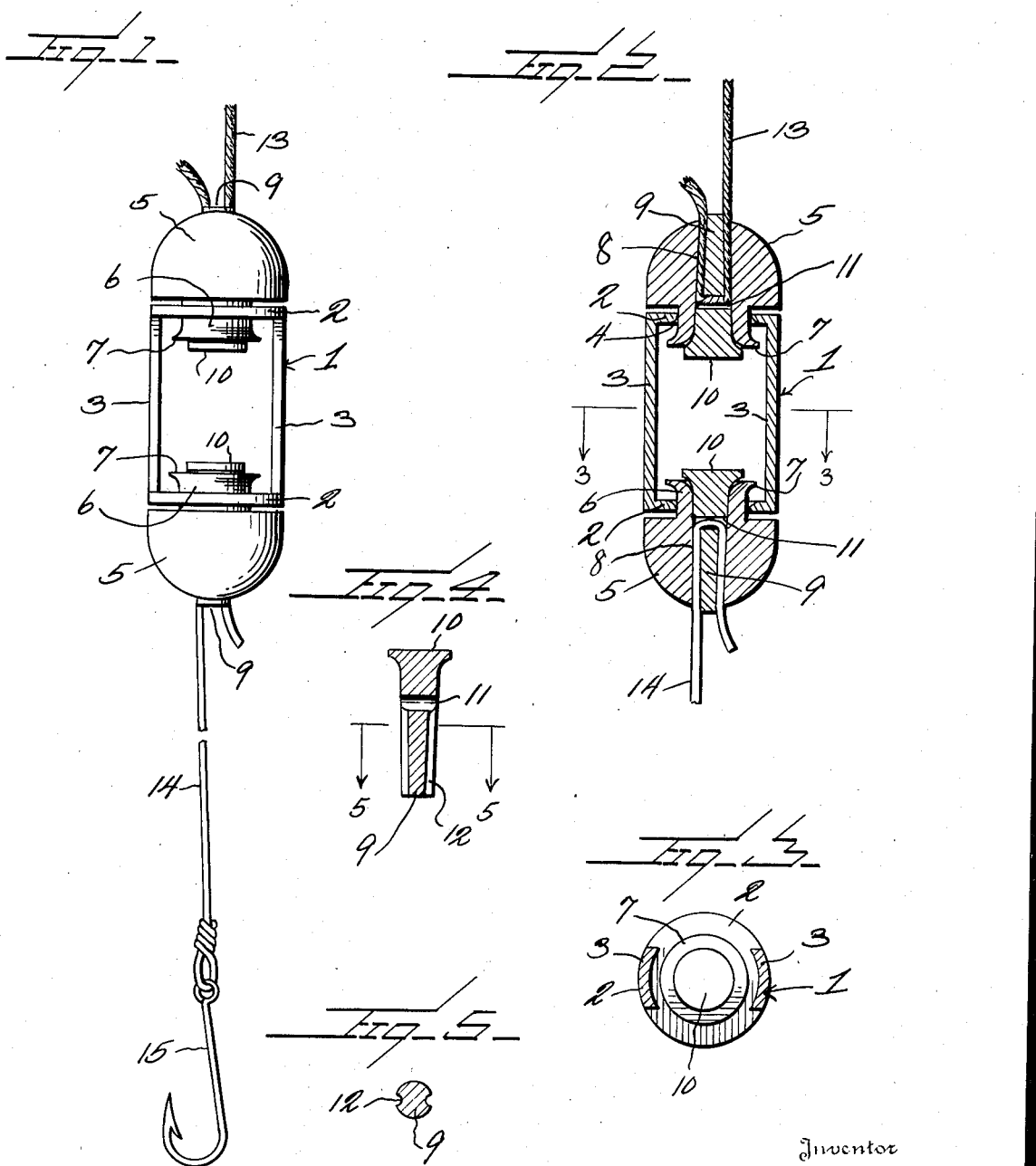

Patented Sept. 17, 1940

2,214,961

UNITED STATES PATENT OFFICE 2,214,961

COMBINED WEIGHT AND SWIVEL DEVICE

Edward T. Hawley, St. Petersburg, Fla.

Application April 22, 1939, Serial No. 269,498

7 Claims. (Cl. 43—52)

This invention relates to improvements in fishing devices and pertains particularly to an improved swivel and sinker combination.

The primary object of the present invention is to provide a novel combined swivel and sinker for use in fishing whereby the fishing line and hook will be properly carried down into the water and the hook may be free to turn around in the water without twisting or knotting the line.

Another object of the present invention is to provide in a device of the above described character, a novel means for effecting the attachment of the device to a line or to the leader of a hook, whereby the connection will be maintained tight at all times so that all danger of losing the hook or sinker is avoided and at the same time such connection may be easily and quickly broken for the removal of the sinker or for the removal of the hook and its replacement by another.

A further object of the invention is to provide in a device of the above described character, a novel means for coupling the device to a line or to the leader of a hook whereby such coupling means will be made increasingly tighter as the pull upon the line increases as when a fish is caught on a hook.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view in side elevation of the combined swivel and sinker embodying the present invention, showing the attachment of a line and hook leader thereto.

Fig. 2 is a longitudinal section through the device showing in more detail the line and leader attaching means.

Fig. 3 is a section on the line 3—3 of Fig. 2.

Fig. 4 is a longitudinal section through a line securing pin.

Fig. 5 is a section on the line 5—5 of Fig. 4.

Referring now more particularly to the drawing, it will be seen that the device embodying the present invention consists of a central swivel frame which is generally indicated by the numeral 1 and which is made up of the two end disks 2 connected by the side bars 3. The disks 2 are provided with central openings 4. At each end of the frame 1 is a weight body 5 which is substantially of semi-spherical form and has formed integral therewith and projecting from the flat side thereof, the collar 6, which extends through the aperture 4 of the adjacent plate 2 and is flared at its end as indicated at 7, so that it will be securely maintained in the aperture 4 but will be permitted free rotary movement therein.

Extending longitudinally through each weight body 5 and the collar 6 is a bore 8 which tapers from the inner or collar end to the outer end of the weight.

Each bore 8 has fitted therein the relatively long tapered pin 9, the larger end of which terminates in a head 10 and this pin has a passage 11 formed transversely therethrough which at each end merges with a groove 12 which extends along the side of the pin to the tapered end thereof. The taper of each pin substantially conforms with the taper of the bore 8 in which it is positioned and each pin is introduced into its bore from within the frame 1.

The numeral 13 designates a portion of a fishing line which is attached to one end of the device while the numeral 14 designates a leader which is attached to the other end of the device and which has attached thereto a hook 15.

It will be readily seen upon reference to Fig. 2 that in attaching the line 13 or the leader 14, the same is first extended through the transverse passage 11 of a pin 9 after extending the line or leader through the bore 8. The free end of the leader or line is then bent over to lie in one groove 12, the opposite part of the line or leader lying in the opposite groove and the pin is then inserted into the bore from the wider end thereof or from within the frame 1, so that the turned end and the opposite part of the leader or line will be firmly compressed between the wall of the bore and the groove in which it lies as the pin is forced tightly into the bore. It will thus be observed that with this connection, when opposing strains are applied to the line and the leader, the securing pins 9 will be more firmly drawn into their respective bores so that the line and leader will be more firmly gripped and thus all possibility of the connection becoming loosened so as to release the device from the line or so as to release the hook from the device is avoided.

It will also be apparent that with this device, the weight may rotate freely with the hook and thus when a fish is caught, the twisting and knotting of the line will be avoided even though the fish may turn and twist in the water before it is landed.

What is claimed is:

1. A device of the character described, comprising a pair of weight bodies, a frame interposed between the bodies, a swivel coupling between each body and the adjacent portion of the frame, each weight body having a bore extending longitudinally therethrough, and a longitudinally grooved pin formed to fit in each bore for securing a line therein, the line being secured in said groove between the wall of the same and the wall of the bore.

2. A device of the character described, comprising a pair of weight bodies, a frame interposed between the bodies, a swivel coupling between each body and the adjacent portion of the frame, each weight body having a bore extending longitudinally therethrough, and a longitudinally grooved pin formed to fit in each bore for securing a line therein, the line being secured in said groove between the wall of the same and the wall of the bore, said pin and bore being tapered and said bore having the wider end of the taper opening into the frame.

3. A device of the character described, comprising a pair of weight bodies, a frame interposed between the weight bodies and having a centrally apertured plate at each end adjacent which a weight body is disposed, a collar forming an integral part of each weight body and extending through the adjacent apertured plate, said collar being flared upon its inner end to maintain it in swiveled connection with the plate, each of said weight bodies having a tapered bore extending longitudinally therethrough and through the collar, the wider end of the bore opening through the collar into the frame, and a tapered line securing pin insertible into each bore from within the frame.

4. A device of the character described, comprising a pair of weight bodies, a frame interposed between the weight bodies and having a centrally apertured plate at each end adjacent which a weight body is disposed, a collar forming an integral part of each weight body and extending through the adjacent apertured plate, said collar being flared upon its inner end to maintain it in swiveled connection with the plate, each of said weight bodies having a tapered bore extending longitudinally therethrough and through the collar, the wider end of the bore opening through the collar into the frame, and a tapered line securing pin insertible into each bore from within the frame, said pin having a line receiving passage extending transversely therethrough and merging at each end into a groove extending along the side of the pin toward the tapered end thereof.

5. A swivel connection between flexible rope-like bodies, comprising a pair of body members disposed in spaced relation and having sleeve-like extensions upon their opposed faces, said bodies having tapered passages extending longitudinally therethrough and through the sleeve-like extensions, the passages being of greatest width at the ends of the sleeve-like extensions, a frame interposed between the bodies and having opposite end plates each having a central aperture in which a sleeve is swivelly connected, and means insertible in each of said passages from the larger end thereof for securing a rope-like body in the passage.

6. A swivel connection between flexible rope-like bodies, comprising a pair of body members disposed in spaced relation and having sleeve-like extensions upon their opposed faces, said bodies having tapered passages extending longitudinally therethrough and through the sleeve-like extensions, the passages being of greatest width at the ends of the sleeve-like extensions, a frame interposed between the bodies and having opposite end plates each having a central aperture in which a sleeve is swivelly connected, and means insertible in each of said passages from the larger end thereof for securing a rope-like body in the passage, said means consisting of a tapered plug having a bore transversely thereof through which the rope-like body is extended and having opposite grooves extending from the bore longitudinally of the plug to the tapered end thereof.

7. A device of the character described, comprising a pair of weight bodies, an open frame interposed between the bodies, means forming a swivel coupling between each body and an adjacent portion of the frame, each of said weight bodies having a bore extending longitudinally therethrough, the bores of said bodies being axially alined and designed to receive an end of a line, and a pin member formed to fit in each bore to secure therein the inserted line end between the wall of the pin and the wall of the bore.

EDWARD T. HAWLEY.